United States Patent Office 3,358,022
Patented Dec. 12, 1967

3,358,022
THIOAMIDES
Pierre Reynaud, Moissy-Cramayel, France, assignor to Societe Anonyme dite: Laboratoire Roger Bellon, Neuilly-sur-Seine, Hauts-de-Seine, France, a French company
No Drawing. Filed Dec. 22, 1964, Ser. No. 420,428
Claims priority, application Great Britain, Dec. 24, 1963, 50,976/63
20 Claims. (Cl. 260—551)

This invention relates to thioamides of therapeutic utility.

The thioamides of the present invention have the general formula:

$$R_1-CS-NH-(CH_2)_n-NR_2R_3 \quad I$$

and their acid addition salts, in which $R_1$ represents an alkyl, aralkyl, aryl or substituted aryl radical, $R_2$ and $R_3$ are alkyl radicals, and $n$ is an integer, preferably 2 or 3. The preferred aryl radical $R_1$ is phenyl and preferred substituted aryl radicals are p-chloro-, p-acylamino-, p-alkyl, and p-alkoxy-phenyl. In all the aforesaid alkyl and acyl groups, the preferred maximum number of carbon atoms is five.

Such thioamides may be prepared by reacting a thionic ester of the formula $R_1.CS.O$-alkyl with a metal derivative of an amine of formula $H_2N(CH_2)_nNR_2R_3$. The preparation of certain preferred compounds of this invention by this process is described in detail in the examples below.

The thioamides of Formula I are useful in therapeutics, notably as antifibrillants, regulators of cardiac rhythm, and as local anaesthetics. Details relating to their therapeutic activity are given below.

The following examples illustrate the invention. In the examples, the alkyl groups all have the normal configuration unless otherwise indicated.

The procedure of Example 1 is given by way of illustration. In every case, unreacted thionic ester is readily recovered and the yields based on reacted ester are almost quantitative.

EXAMPLE 1

In a two-necked, 250 cc. round bottom flask provided with a mechanical stirrer, 0.16 mole of ethyl magnesium bromide in tetrahydrofuran (40 ml.) is prepared. To this solution, 9.28 g. (0.08 mole) of diethylaminoethylamine dissolved in 10 ml. of tetrahydrofuran are slowly added. The mixture refluxes vigorously and the di-halomagnesium amine formed by the reaction precipitates. The mixture produced is refluxed for fifteen minutes and then 8.40 g. (0.04 mole) of ethyl p-ethoxythionbenzoate are added as rapidly as possible. The mixture refluxes rapidly and the precipitate goes into solution. The clear reaction product is refluxed for an hour and then allowed to stand overnight. A crystalline precipitate forms. The reaction product is poured onto 150 ml. of iced N/5 hydrochloric acid and the acid mixture is extracted with ether to remove 1.8 g. of unreacted thionic ester. 3 g. of ammonium chloride are added to the aqueous solution which is then made alkaline with ammonia. Extraction with ether provides 8.5 g. of a base which, when distilled, yields 7 g. of a yellow oil, B.P. 188° C./0.01 mm. Hg, and titrating 9.8 ml. of N/10 hydrochloric acid for each 0.275 g. (using a methyl red indicator: theory is 9.8 ml.). The hydrochloride, recrystalised from methylene chloride/ether forms yellow prismatic crystals, M.P. 147° C.

*Analysis.*—$C_{15}H_{25}ClNOS$, molecular weight 316.5, requires C, 56.86%; H, 7.89%; N, 8.84%; S, 10.11%. Found C, 56.76%; H, 7.62%; N, 8.82%; S, 10.12%.

TABLE I

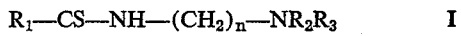

| Example No. | Formula | Yield, percent | Physical Properties |
|---|---|---|---|
| 1 | $C_2H_5O$—⟨ ⟩—$CSNH(CH_2)_2N(C_2H_5)_2$ | 60 | B.P.=188° C./0.01 mm. Hg. hydrochloride, M.P.=145–147° C. (from methylene chloride-ether). |
| 2 | $CH_3O$—⟨ ⟩—$CSNH(CH_2)_2N(C_2H_5)_2$ | 75 | B.P.=175–176° C./0.05 mm. Hg. neutral sulphate with $2H_2O$, M.P.=165° C. (from isopropanol), M.P.=92° C. (from $CH_2Cl_2$-ether). |
| 3 | $CH_3O$—⟨ ⟩—$CSNH(CH_2)_3N(C_2H_5)_2$ | 70 | B.P.=175–176° C./0.01 mm. Hg. Hydrochloride, M.P.=155–156° C. (from $CHCl_3$-ether). |
| 4 | $C_2H_5O$—⟨ ⟩—$CSNH(CH_2)_3N(C_2H_5)_2$ | 65 | B.P.=199° C./0.02 mm. Hg. Hydrochloride, M.P.=147–148° C. (from $CH_2Cl_2$-ether). |
| 5 | $C_3H_7O$—⟨ ⟩—$CSNH(CH_2)_2N(C_2H_5)_2$ | 50 | B.P.=188–189° C./0.02 mm. Hg. |
| 6 | $C_3H_7O$—⟨ ⟩—$CSNH(CH_2)_3N(C_2H_5)_2$ | 60 | B.P.=191–192° C./0.01 mm. Hg. Hydrochloride, M.P.=105° C. (from $CH_2Cl_2$-ether). |
| 7 | $i$-$C_3H_7O$—⟨ ⟩—$CSNH(CH_2)_2N(C_2H_5)_2$ | 60 | B.P.=180° C./0.01 mm. Hg. |
| 8 | $C_4H_9O$—⟨ ⟩—$CSNH(CH_2)_2N(C_2H_5)_2$ | 68 | B.P.=210° C./0.01 mm. Hg. Hydrochloride, M.P.=124–125° C. (from $CH_2Cl_2$-ether). |
| 9 | $C_4H_9O$—⟨ ⟩—$CSNH(CH_2)_3N(C_2H_5)_2$ | 65 | Hydrochloride, M.P.=102–103° C. (from $CH_2Cl_2$-ether). |
| 10 | $i$-$C_4H_9O$—⟨ ⟩—$CSNH(CH_2)_2N(C_2H_5)_2$ | | B.P.=207° C./0.01 mm. Hg. |
| 11 | $i$-$C_4H_9O$—⟨ ⟩—$CSNH(CH_2)_3N(C_2H_5)_2$ | 65 | Hydrochloride, M.P.=135° C. (from $CH_2Cl_2$-ether). |
| 12 | $i$-$C_5H_{11}O$—⟨ ⟩—$CSNH(CH_2)_2N(C_2H_5)_2$ | | |

TABLE I.—Continued

| Example No. | Formula | Yield, percent | Physical Properties |
|---|---|---|---|
| 13 | $i\text{-}C_5H_{11}O\text{-}C_6H_4\text{-}CSNH(CH_2)_3N(C_2H_5)_2$ | | |
| 14 | $C_3H_7O\text{-}C_6H_4\text{-}CSNH(CH_2)_3N(CH_3)_2$ | 80 | Hydrochloride, M.P.=121° C. (from $CH_2Cl_2$-ether). |
| 15 | $i\text{-}C_3H_7O\text{-}C_6H_4\text{-}CSNH(CH_2)_3N(C_2H_5)_2$ | 80 | Hydrochloride, M.P.=131.5° C. (from $CH_2Cl_2$-ether). |
| 16 | $C_4H_9O\text{-}C_6H_4\text{-}CSNH(CH_2)_3N(CH_3)_2$ | 90 | Hydrochloride, M.P.=127° C. (from $CH_2Cl_2$-ether.) |
| 17 | $C_3H_7O\text{-}C_6H_4\text{-}CSNH(CH_2)_2N(CH_3)_2$ | 60 | Hydrochloride, M.P.=134° C. (from ethanol ether). |
| 18 | $i\text{-}C_3H_7O\text{-}C_6H_4\text{-}CSNH(CH_2)_3N(CH_3)_2$ | 70 | Hydrochloride, M.P.=89° C. (from ethanol-ether). |
| 19 | $i\text{-}C_4H_9O\text{-}C_6H_4\text{-}CSNH(CH_2)_3N(CH_3)_2$ | 60 | Hydrochloride, M.P.=60° C. (from ethanol-ether). |

Aqueous solutions of salts of the compounds of these examples are foaming.

The thioamides of the invention can be purified by chromatography, e.g. on a column of Brockmann alumina, as well as by distillation. For example, either of the following methods may be adopted. In the first, a solution of the crude base in a mixture of benzene and ether with enough petroleum ether almost to cause precipitation of the base, is introduced to the top of the column, and the column is then eluted successively with a mixture of benzene and petroleum ether (10:90), in order to eliminate a small amount of thionic ester; and then with benzene:methylene chloride (75:25) to elute the thioamide. The latter is obtained practically pure and can readily be converted into its pure salts. Alternatively, the crude hydrochloride may be dissolved in methylene chloride and added to the alumina column. By elution with the same solvent, the thioamide is obtained in the form of the pure base, which may be transformed again into its hydrochloride by neutralisation with anhydrous alcoholic hydrogen chloride. The pure hydrochloride may then be precipitated from the alcoholic solution by addition of ether.

The antifibrillant activity is very distinct, probably due to their structural relationship to the amide procaine. Their $LD_{50}$ is between 60 and 70 mg./kg. of hydrochloride (on intravenous administration in the mouse). A dose of 20 mg./kg. of compound 8 protects 100% of mice subjected to the calcium chloride test, and compounds 9 and 6 in a dosage of 10 mg./kg. similarly protect 50% and 40% of the animals respectively. This activity is accompanied by a remarkable bradycardia without any distortion of the waves of the electrocardiograph. Unlike procain, these compounds assure the survival of a considerable percentage of animals, probably because of their less rapid metabolism. The derivatives generally most active as antifibrillants contain the diethylaminoethyl chain, especially compound 8.

The invention includes within its scope pharmaceutical compositions comprising, in association with a pharmaceutical carrier, at least one thioamide of the invention or acid addition salt thereof. Such compositions may be made up in a form suitable for oral, parenteral, or rectal administration, as, for example, tablets, pills, dragees, capsules, syrups, sterile injectible aqueous and non-aqueous solutions and suspensions, and suppositories. All of the conventionally used carriers which are compatible with the compounds of the invention may be used and the normal methods of fabricating such compositions are operable.

The toxicity of the compounds of the invention has been determined by the method of Karber and Behrens using intravenous administration in male mice. The results obtained are given in the table below:

TABLE II

| Compound tested: Compound of Example— | Toxicity, $LD_{50}$ (mg./kg.) |
|---|---|
| 1 | 94 |
| 4 | 61.5 |
| 6 | 60 |
| 7 | 78 |
| 8 | 75 |
| 11 | 76 |
| 14 | 126 |
| 15 (two tests) | 90–100 |
| 16 | 126 |
| Quinidine sulphate | 67 |
| Procainamide hydrochloride | 125 |

These results show that the intravenous toxicity of the compounds of the invention is between that of quinidine and that of procaine amide, and that the therapeutic coefficient (equals effective concentration/$LD_{50}$) is between 0.26 and 0.36.

The antifibrillant activity and effect on the cardiac rhythm of the new compounds were tested as follows, using the compounds of Examples 1, 4, 6, 7, 8, 9, 11, 14, 15 and 16. Tests were carried out on the isolated rabbit auricles excited electrically (the method of Dawes) and on the ventricles of anaesthetised rate which had received an intravenous injection of calcium chloride (the method of Malinow).

In the method of Dawes, the apparatus used was that of Alles and Ellis. The auricular frequency is stimulated electrically to a faster and faster rhythm, and the maximum frequency at which fibrillation breaks down is noted. The results shown below in Table III give the percentage reduction in the frequency of breakdown caused by administering the indicated doses of the substances tested.

TABLE III

| Compound tested | Dose | | | | |
|---|---|---|---|---|---|
| | $2.5 \cdot 10^{-7}$ | $5 \cdot 10^{-7}$ | $10^{-6}$ | $2.5 \cdot 10^{-6}$ | $5 \cdot 10^{-6}$ |
| Quinidine sulphate | | −9 | −14 | −19 | |
| Procainamide hydrochloride | | No noticeable effect at these doses | | | |
| Compound of example: | | | | | |
| 1 | | −16 | −22 | −57 | |
| 4 | −10 | −3 | −16 | | |
| 6 | −16 | −27 | −16 | −35 | |
| 7 | −10 | −10 | −18 | −30 | −33 |
| 8 | −13 | −19 | −17 | −23 | |
| 9 | −16 | −14 | −11 | | |
| 11 | −7 | −10 | −12 | −21 | −10 |
| 14 | −8 | −6 | −12 | −21 | |
| 15 | | | −13 | −26 | −37 |
| 16 | −3 | −5 | −17 | −20 | −32 |

In the method of Malinow, the dose of substance under test is found which prevents the fibrillation and flutter caused by the intravenous injection of calcium chloride, in a dose of 200 mg./kg. (a hundred percent lethal dose) in the rat. The compounds of the invention were compared as before with procaine amide hydrochloride and quinidine sulphate. The results obtained are shown in the following Table IV.

TABLE IV

| Compound tested | Dose, mg./kg. | Protection against— | | | |
|---|---|---|---|---|---|
| | | Flutter | Fibrillation | Flutter and fibrillation | Survival |
| Procainamide hydrochloride | 20 | 0/10 | 0/10 | 0/10 | 0/10 |
| | 40 | 5/10 | 2/10 | 2/10 | 0/10 |
| | 50 | 10/10 | 7/10 | 7/10 | 3/10 |
| | 60 | 9/10 | 7/10 | 6/10 | 4/10 |
| | 80 | 9/10 | 7/10 | 6/10 | 3/10 |
| Quinidine Sulphate | 5 | 0/10 | 0/10 | 0/10 | 0/10 |
| | 10 | 10/10 | 3/10 | 3/10 | 0/10 |
| | 15 | 10/10 | 4/10 | 4/10 | 1/10 |
| | 20 | 10/10 | 9/10 | 9/10 | 2/10 |
| Compound of Example: | | | | | |
| 1 | 20 | 4/10 | 3/10 | 2/10 | 0/10 |
| | 30 | 10/10 | 6/10 | 6/10 | 0/10 |
| | 40 | 10/10 | 6/10 | 6/10 | 4/10 |
| 4 | 10 | 3/10 | 0/10 | 0/10 | 0/10 |
| | 20 | 7/10 | 3/10 | 2/10 | 0/10 |
| | 30 | 9/10 | 8/10 | 8/10 | 7/10 |
| 6 | 10 | 7/10 | 0/10 | 0/10 | 0/10 |
| | 15 | 10/10 | 1/10 | 1/10 | 0/10 |
| | 20 | 10/10 | 10/10 | 10/10 | 5/10 |
| 7 | 10 | 2/10 | 0/10 | 0/10 | 0/10 |
| | 20 | 6/10 | 6/10 | 6/10 | 4/10 |
| | 25 | 10/10 | 8/10 | 8/10 | 2/10 |
| | 30 | 10/10 | 10/10 | 10/10 | 6/10 |
| 8 | 10 | 0/10 | 0/10 | 0/10 | 0/10 |
| | 20 | 10/10 | 6/10 | 6/10 | 0/10 |
| | 30 | 10/10 | 6/10 | 6/10 | 1/10 |

For the compounds of Examples 11, 14, 15 and 16, the calcium chloride is injected in a small volume intravenously in a strong enough concentration to provoke in a particular manner flutter, ventricular fibrillation, and death. 0.2 ml. of a 10% calcium chloride solution are injected into a rat weighing 100 grams. The cardiac effects provoked are recorded using a direct reading electrocardiograph, and the animal is given artificial respiration. After the effect of the calcium chloride solution on a control animal has been established, the antifibrillant agent under study is injected to control the effect. For two minutes, the effect of the substance under test on the electro-cardiogram is followed, and the calcium chloride solution (again using 0.2 ml. for a 100 g. rat) is then injected. The compound under test may have an effect against flutter, against ventricular fibrillation observed directly after the death of the animal by sternocostal section, against both these effects, or even against the lethal effect of the calcium. The results obtained are given below in Table V.

TABLE V

| Compound of Example | Dose, mg./kg. | Protection against— | | | |
|---|---|---|---|---|---|
| | | Flutter | Fibrillation | Flutter and fibrillation | Survival |
| 11 | 10 | 3/10 | 2/10 | 1/10 | 0 |
| | 15 | 8/10 | 4/10 | 3/10 | 2/10 |
| | 20 | 9/10 | 9/10 | 8/10 | 7/10 |
| 14 | 20 | 7/10 | 4/10 | 4/10 | 3/10 |
| | 25 | 10/10 | 4/10 | 4/10 | 1/10 |
| | 30 | 10/10 | 9/10 | 9/10 | 6/10 |
| 15 | 20 | 6/10 | 3/10 | 3/10 | 2/10 |
| | 25 | 10/10 | 8/10 | 8/10 | 6/10 |
| | 30 | 10/10 | 10/10 | 10/10 | 8/10 |
| 16 | 10 | 0 | 0 | 0 | 0 |
| | 15 | 7/10 | 3/10 | 3/10 | 2/10 |
| | 20 | 7/10 | 4/10 | 4/10 | 3/10 |
| | 25 | 7/10 | 3/10 | 3/10 | 2/10 |

The results obtained show that, in the test of Malinow, the compounds of Examples 4, 6, 7, 11 and 15 show an effect greatly superior to that of procaine amide hydrochloride. Thus, while procaine amide in a dose of 80 mg./kg. only protects 60% of the rats, the compounds of Examples 4, 6 and 7 protect all the animals in a dose of 20–30 mg./kg.

The compounds of Examples 6, 7, 11 and 15 show an effect appreciably greater than that of quinidine.

In every case, the compounds of the invention give survival coefficients 2 to 4 times better. A single dose of 30 mg./kg. of the compound of Example 15 gives total protection, even after a second injection of 200 mg./kg. of calcium chloride, 17 minutes after the injection of the compound of the invention, and still ensures the survival of at least 20% of the animals. This effect on the survival is particularly noticeable with the compounds of the invention containing a trimethylene chain between the two nitrogen atoms.

The antifibrillant activity of the compounds of the invention is accompanied by a remarkable bradycardia, and the electro-cardiograms recorded are much better than those observed following the injection of preventive amounts of procaine amide hydrochloride or quinidine sulphate. No distortion of the electro-cardiogram waves is apparent.

In the test of Dawes the compounds of the invention in dilutions between $5 \times 10^{-7}$ and $2.5 \times 10^{-6}$ have a much greater effect than quinidine, whereas procaine amide hydrochloride is ineffective at these doses.

Like quinidine, the compounds of the invention are effective in both the described tests, but they are more active against auricular fibrillation and are less toxic, as is shown by the figures given in Table II above.

I claim:
1. The compound of formula:

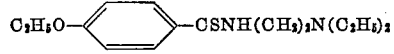

and a pharmaceutically acceptable acid addition salt of said compound.

2. The compound of formula:

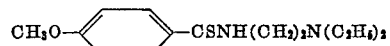

and a pharmaceutically acceptable acid addition salt of said compound.

3. The compound of formula:

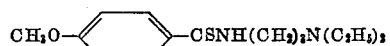

and a pharmaceutically acceptable acid addition salt of said compound.

4. The compound of formula:

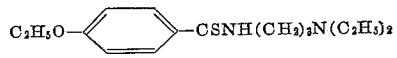

and a pharmaceutically acceptable acid addition salt of said compound.

5. The compound of formula:

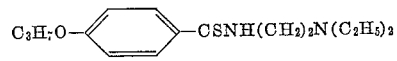

and a pharmaceutically acceptable acid addition salt of said compound.

6. The compound of formula:

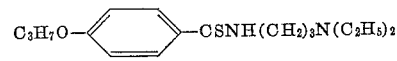

and a pharmaceutically acceptable acid addition salt of said compound.

7. The compound of formula:

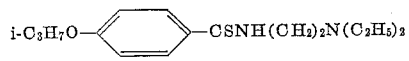

and a pharmaceutically acceptable acid addition salt of said compound.

8. The compound of formula:

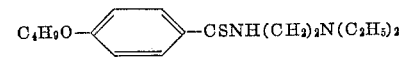

and a pharmaceutically acceptable acid addition salt of said compound.

9. The compound of formula:

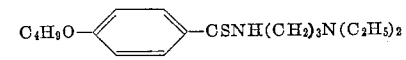

and a pharmaceutically acceptable acid addition salt of said compound.

10. The compound of formula:

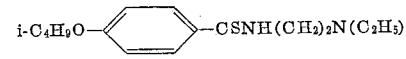

and a pharmaceutically acceptable acid addition salt of said compound.

11. The compound of formula:

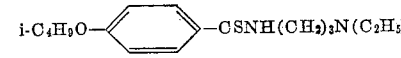

and a pharmaceutically acceptable acid addition salt of said compound.

12. The compound of formula:

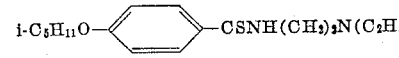

and a pharmaceutically acceptable acid addition salt of said compound.

13. The compound of formula:

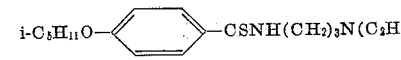

and a pharmaceutically acceptable acid addition salt of said compound.

14. The compound of formula:

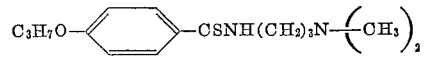

and a pharmaceutically acceptable acid addition salt of said compound.

15. The compound of formula:

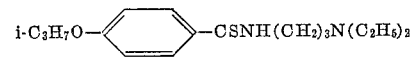

and a pharmaceutically acceptable acid addition salt of said compound.

16. The compound of formula:

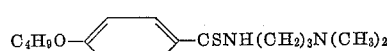

and a pharmaceutically acceptable acid addition salt of said compound.

17. The compound of formula:

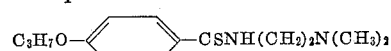

and a pharmaceutically acceptable acid addition salt of said compound.

18. The compound of formula:

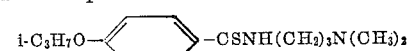

and a pharmaceutically acceptable acid addition salt of said compound.

19. The compound of formula:

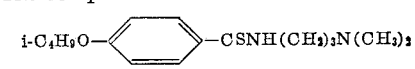

and a pharmaceutically acceptable acid addition salt of said compound.

20. A compound selected from the group consisting of a thioamide of the formula

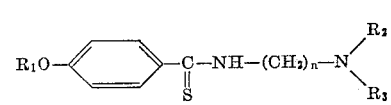

wherein
$R_1$ is lower alkyl,
$R_2$ and $R_3$ are identical lower alkyls, and
$n$ is one of the integers 2 and 3, and
a pharmaceutically acceptable acid addition salt of said compound.

References Cited

UNITED STATES PATENTS 2,201,171   5/1940   Hanford _____ 260—551

OTHER REFERENCES

Pesson et al.: Societe Chimique de France (1962), pages 1364–1371.

WALTER A. MODANCE, *Primary Examiner.*

H. I. MOATZ, *Assistant Examiner.*